(12) United States Patent
Charier et al.

(10) Patent No.: US 7,766,607 B2
(45) Date of Patent: Aug. 3, 2010

(54) DEVICE FOR VENTILATING TURBINE DISKS IN A GAS TURBINE ENGINE

(75) Inventors: Gilles Alain Marie Charier, La Grande Paroisse (FR); Stephane Rousselin, Hericy (FR); Philippe Pierre Vincent Bouiller, Samoreau (FR)

(73) Assignee: SNECMA, Paris (FR)

( * ) Notice: Subject to any disclaimer, the term of this patent is extended or adjusted under 35 U.S.C. 154(b) by 929 days.

(21) Appl. No.: 11/551,560

(22) Filed: Oct. 20, 2006

(65) Prior Publication Data

US 2007/0137221 A1    Jun. 21, 2007

(30) Foreign Application Priority Data

Oct. 21, 2005    (FR) .................................... 05 53216

(51) Int. Cl.
F04D 29/38    (2006.01)
(52) U.S. Cl. ...................... 415/115; 415/175
(58) Field of Classification Search ................ 415/115, 415/199.6, 169.1, 175, 176, 177, 178, 179, 415/180; 416/95, 96 R; 60/806, 782
See application file for complete search history.

(56) References Cited

U.S. PATENT DOCUMENTS

| 5,226,785 | A |   | 7/1993  | Narayana et al. |
|-----------|---|---|---------|-----------------|
| 5,586,860 | A |   | 12/1996 | Bertrand et al. |
| 5,700,130 | A | * | 12/1997 | Barbot et al. ................. 416/95 |
| 5,984,636 | A |   | 11/1999 | Fahndrich et al. |
| 6,612,114 | B1| * | 9/2003  | Klingels ..................... 60/785 |

FOREIGN PATENT DOCUMENTS

| EP | 0 469 784 A2 | 2/1992 |
|----|--------------|--------|
| JP | 2005-42669   | 2/2005 |

* cited by examiner

*Primary Examiner*—Edward Look
*Assistant Examiner*—Aaron R Eastman
(74) *Attorney, Agent, or Firm*—Oblon, Spivak, McClelland, Maier & Neustadt, L.L.P.

(57) ABSTRACT

A device for ventilating turbine components in a gas turbine engine which includes first and second turbine rotors mechanically independent of each other, the first turbine rotor includes an HP turbine disk and the second turbine rotor includes an LP turbine disk and with a first circuit for ventilating the LP turbine is disclosed. The device includes an air compression wheel arranged downstream of the HP turbine disk between the HP turbine disk and LP turbine disk in order to assist the circulation of the air in the first circuit.

19 Claims, 4 Drawing Sheets

DEVICE FOR VENTILATING TURBINE DISKS IN A GAS TURBINE ENGINE

BACKGROUND OF THE INVENTION

The present invention relates to the field of gas turbine engines and focuses on the circulation of the air required for the ventilation and cooling of components located downstream of the combustion chamber, especially the turbine disks.

In a gas turbine engine, it is necessary to make air circulate through all the components subject to thermal stresses from hot gases downstream of the combustion chamber in order to control their temperature. In a two-cylinder engine, the air circuit for the ventilation of the high pressure section is distinct from the one for ventilating the low pressure section located downstream, because the materials and the thermal stresses are different.

The present invention relates to the low pressure section ventilation circuit.

DESCRIPTION OF THE PRIOR ART

In a modern two-cylinder engine for civilian use, such as the CFM engine, comprising a high-pressure (HP) cylinder with an HP turbine stage 10 and a low-pressure (LP) cylinder with an LP turbine 30 with three stages 31, 32 and 33, the various circuits providing ventilation downstream of the high-pressure turbine are illustrated in FIG. 1; the following items can be seen:

An air flow A, drawn off from the center of the HP compressor, routed through the vanes of the distributor 20 of the first LP stage and providing at A' the purging of the downstream cavity 11 of the HP turbine 10.

A fraction A" of this same flow providing the ventilation of the passages in the first two fans of stages 31 and 32 of the low-pressure turbine 30.

An air flow B drawn off upstream of the HP compressor, routed through the passage 13 in the HP turbine 10 and providing the ventilation of the passage in the third stage 33 of the LP turbine 30.

An air flow C drawn off at the LP compressor, routed through the passage 13 in the HP turbine 10, and providing the pressurization of the covers 36 of the chambers containing the bearings.

Compressors for this type of engine are axial and have sufficient spaces for guiding the various ventilation air flows from the draw-off zone to where they are used.

Some engines that are less powerful and more compact have an HP cylinder with a shorter radial compressor, and their compression ratio is lower. This arrangement poses problems when it comes to providing the ventilation function mentioned above.

The pressure is not always sufficient to ventilate the passages in the LP turbine disks correctly, and this situation is not helped by the small cross section of flow between the passage in the HP turbine and the LP shaft.

The radial compressor centrifugal wheel has a relatively large output diameter. This results in a reduced gap for the air routed to the LP turbine first stage distributor. In addition, as shown in FIG. 2, the draw-off within the HP compressor is often carried out by means of centripetal draw-off tubes which cause a large pressure drop in the ventilation air.

The objective of the invention is to solve the abovementioned problems, by providing a means for correctly ventilating the LP turbine disks, especially in compact engines having a centrifugal compressor, which also takes into account the specific dimensional constraints for this type of engine.

Referring to FIG. 2, it shows what is known as a "small" two-cylinder gas turbine engine. The high-pressure (HP) cylinder comprises a turbine 110 connected to an HP compressor 115 by a shaft 117. The compressor 115 is of the centrifugal wheel type. The low-pressure cylinder comprises a low-pressure turbine 120 with several stages mounted on a shaft 127, coaxial with the shaft 117, being connected to an axial-type low-pressure compressor 125, itself having several stages. A combustion chamber 130 is arranged between the compressor and the HP cylinder turbine. A distributor stage 140 separates the two turbines 110 and 120.

As can be seen on this figure without the use of the invention, a first ventilation air circuit E comprises an air inlet upstream of the HP compressor and this air is directed axially between the two shafts 117 and 127 through the passage in the turbine rotor 110 in order to ventilate the downstream cavity of the turbine. A second air circuit is guided between the outer casing 150 of the engine and HP cylinder housing via tubes that are not shown. It appears that such an arrangement is not satisfactory because the quantity of air supplying the ventilation circuits is not sufficient.

With regard to the first circuit, the flow area between the shafts 117 and 127 is too small for the ventilation air.

With regard to the second circuit, there is little space for installing ventilation tubes on the housing.

SUMMARY OF THE INVENTION

The invention manages to achieve this objective by means of a device for ventilating turbine components in a gas turbine engine comprising two turbine rotors that are mechanically independent of each other, each one with at least one turbine disk, an HP turbine disk and an LP turbine disk respectively, and with a first circuit for ventilating the LP turbine. This device is noteworthy in that it comprises an air compression wheel arranged downstream of the HP turbine disk, in particular between said two, HP and LP, turbine disks assisting at least partially the circulation of air in said first air circuit. More particularly, the air inlet of the wheel connects with the passage in the HP turbine disk, and the passage is supplied with air coming from the HP compressor.

Owing to the invention, the air circuits through the turbine passages are used efficiently, and it is now also possible to simplify the structure of the first stage distributor of the low-pressure turbine because it is no longer necessary to route air from it through the vanes.

According to a first embodiment, the compression wheel is connected to the HP turbine disk. Advantageously, the wheel then becomes a structural member of the turbine disk by forming the bearing support. According to a second embodiment the compression wheel is connected to the LP turbine disk.

According to another feature, the compression wheel comprises a disk provided with radial vanes cooperating with a stator baffle in order to compress the air. Advantageously, the baffle includes air guide vanes.

According to another feature, the stator baffle delimits with the HP turbine disk an HP turbine downstream cavity, and the air coming from the HP turbine disk passage partly supplies the wheel and partly supplies the cavity.

According to another feature, the device comprises a second ventilation circuit, said circuit ventilating the separate bearing oil chamber covers, in particular said second circuit comprises a part forming a guide channel that is coaxial with the guide part of the first circuit.

The invention also relates to an air compression wheel for the device comprising a radial plate with a first annular portion provided with mounting holes and a second portion provided with radial vanes. According to a first embodiment, the first portion is radially inside in relation to the second portion. According to a second embodiment, the first portion is radially outside in relation to the second portion.

BRIEF DESCRIPTION OF THE DRAWINGS

The description which follows relates to two non-limiting embodiments of the invention, with reference to the appended drawings, in which.

DESCRIPTION OF THE PREFERRED EMBODIMENTS

Figure 1:
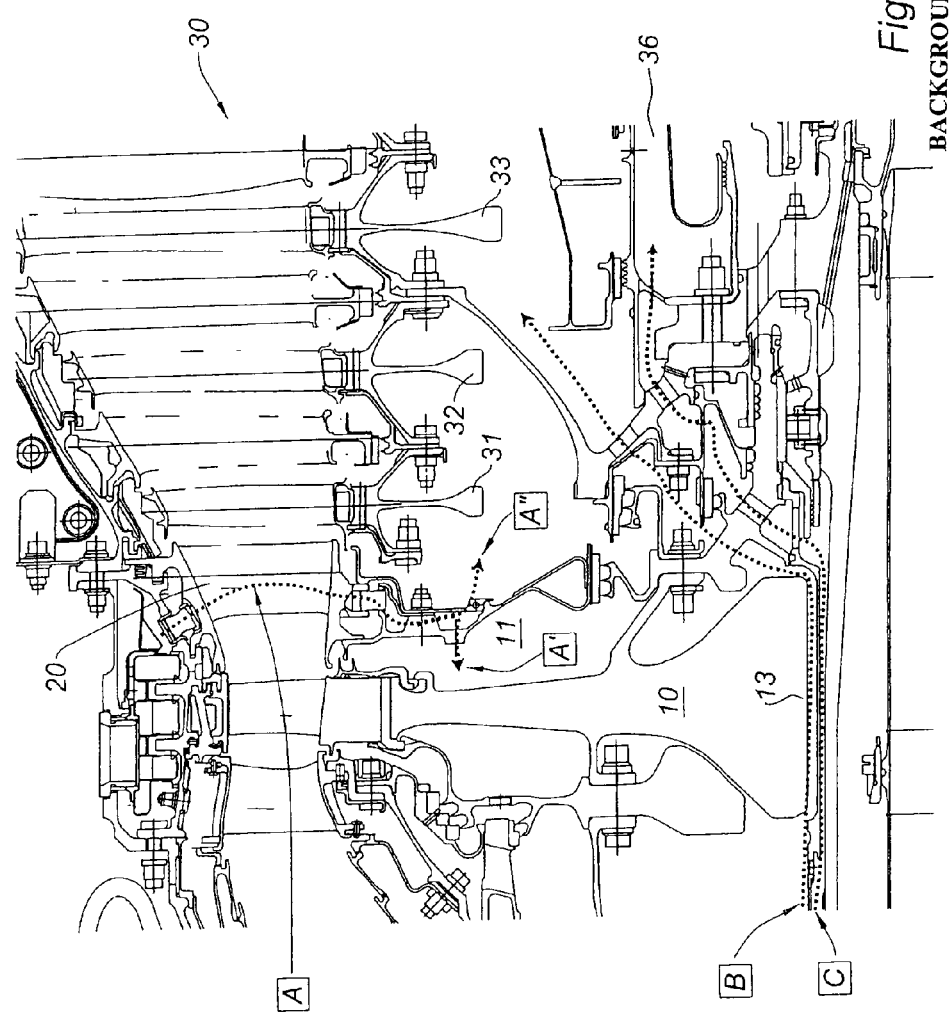
FIG. 1 illustrates in half axial cross section part of a state-of-the-art two-cylinder gas turbine engine, comprising an HP turbine and an LP turbine.
Figure 2:
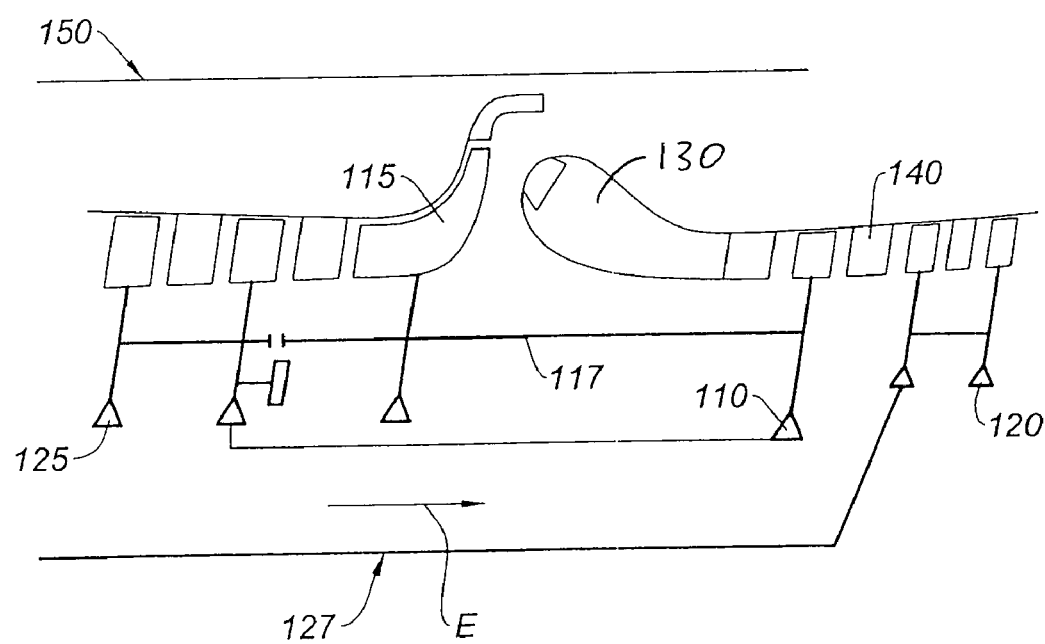
FIG. 2 illustrates in half axial cross section an engine with a radial compressor from the prior art.
Figure 3:
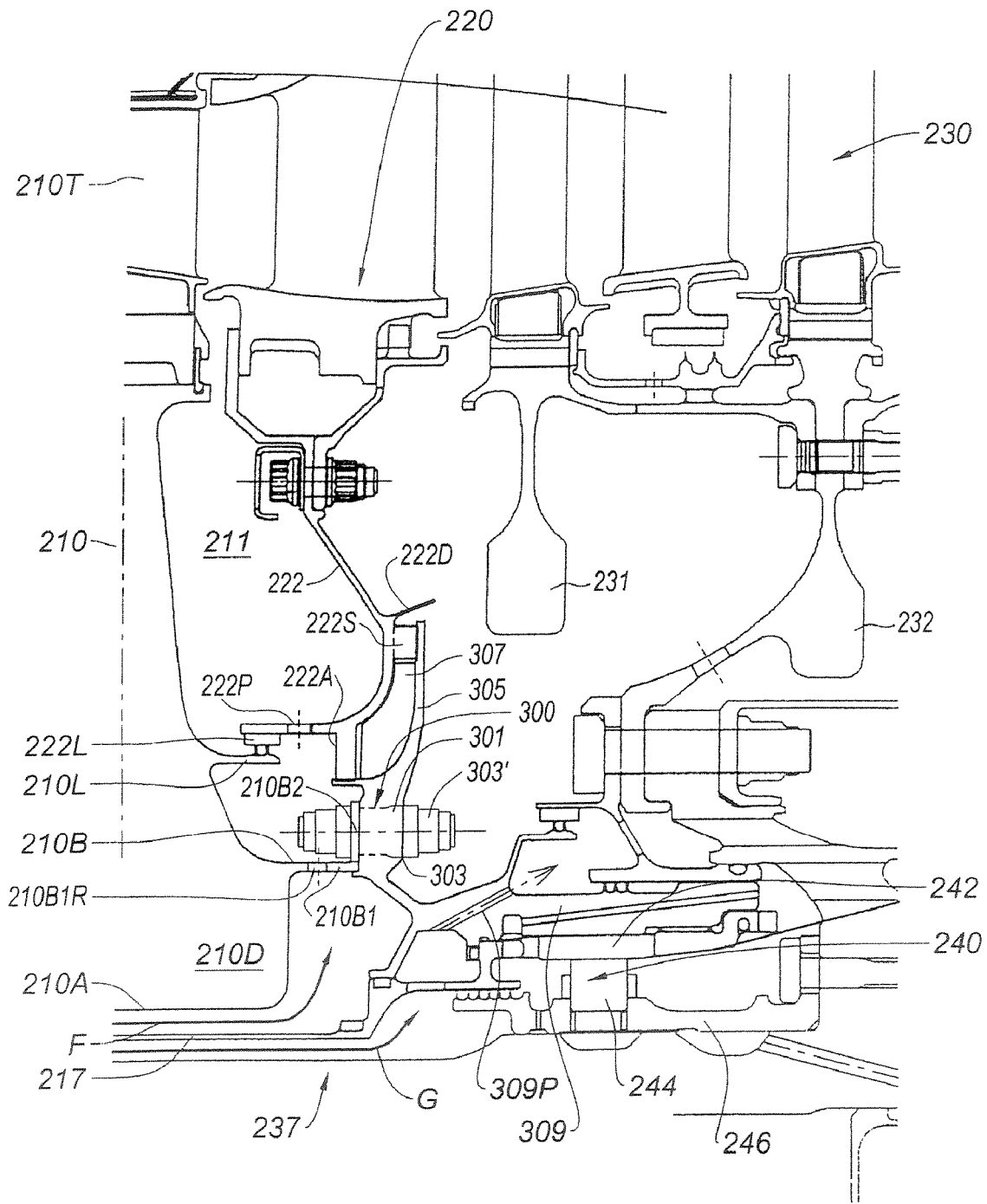
FIG. 3 illustrates in half axial cross section a turbine disk fitted with a wheel according to the invention.
Figure 4:
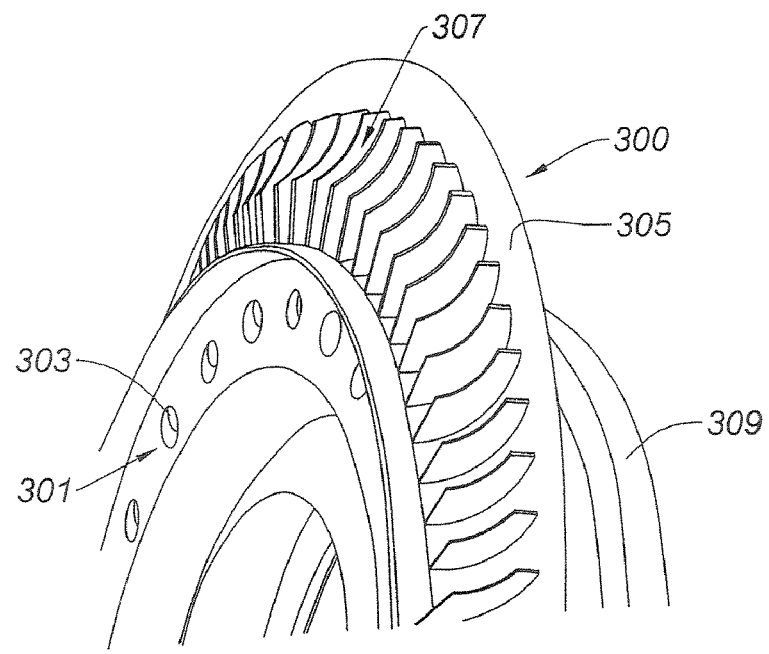
FIG. 4 illustrates in perspective view a single wheel according to the invention.

According to the invention, there has been arranged, downstream of the HP turbine disk, an air compression wheel for ventilating the LP turbine. Such a device is illustrated in FIG. 3.

All that can be seen in this figure is the disk 210D of the HP turbine 210 with a central passage 210A. The disk 210D is connected to the shaft 217. At its upstream end, the shaft 217 is connected to the compressor, which is not visible in the figure. The disk carries HP turbine vanes 210T receiving the hot gases from the combustion chamber not visible in the figure.

A distributor stator stage 220 is placed downstream of the HP turbine 210 immediately upstream of the vanes of the low-pressure LP turbine 230.

This turbine is composed of several disks connected together, of which only the first two, 231 and 232, can be seen. The turbine 230 is carried on a shaft 237. This shaft 237 is concentric with the shaft 217. A downstream inter-shaft bearing 240 holds the two concentric shafts and allows them to rotate freely in relation to each other. The upstream bearing is not visible in the figure, the same as the downstream bearing carrying the shaft 237 in the fixed structure. An annular space F is thus arranged between the passage 210A of the turbine disk and the shaft 217. Another annular space G is also arranged between the two shafts 217 and 237.

The disk 210D has a flange 210B to which is bolted a compression wheel 300. The wheel has a part generally in the form of a disk at right-angles to the engine's axis, with a first portion 301 drilled axially with a series of holes 303 for mounting bolts 303' to pass through for fastening the wheel to the flange 210B. Radially on the outside of this portion, the disk has an annular portion 305 provided with radial vanes 307. This second portion cooperates with a fixed wall 222 to form a centrifugal air compressing means with an axial inlet and a radial outlet. The wall 222 carries axial compressor inlet guide vanes 222A and radial compressor outlet guide vanes 222S. An annular deflector 222D directs the air flow exiting the compressor toward the base of the turbine disks 231 and 232. The wall 222 makes with the turbine disk 210D a space 211 forming said HP turbine downstream cavity, and a labyrinth sealing means 222L cooperates with a corresponding means 210L on the disk in order to confine the air in this cavity 211. Note that the wheel comprises a cylindrical portion 309 forming a support for the outer race 242 of the bearing 240. The bearing elements 244 are thereby arranged between the inner race 246 connected to the shaft 237 and the outer race 242 connected to the shaft 217 and form the inter-shaft bearing 240.

The flange 210B is at right-angles to a cylindrical axial part 210B1 and a perpendicular part 210B2 comprising the holes, cooperating with the holes 303 for the bolts 303' to pass through. The cylindrical part 210B1 is drilled with radial holes 210B1r. An annular space is arranged between the flange 210B, the wheel 300 and the wall 222. Radial holes 222P are made in the wall 222 between the vanes 222A and the seal 222L.

Holes 309P are made in the cylindrical portion 309 of the wheel in order to connect the space G with the downstream part of the low-pressure rotor 230.

The inventive device operates in the following manner.

When the engine is operating, the two rotors, HP and LP respectively, are driven by the gases coming from the combustion chamber. Each one turns independently of the other. The ventilation air drawn off at the final stages of the upstream compressor according to a first circuit is guided into the space F, and passes through the flange 210B via the holes 210B1r. A part is aspirated by the wheel 300, and the other part is guided through the holes 222P into the downstream cavity 211 of the HP turbine that it ventilates. The compressed air in the compression channels of the wheel 300 is evacuated in the direction of the turbine disks 231 and 232 for which it provides the ventilation, and is evacuated into the combustion gas stream or via the appropriate orifices through the LP turbine support 230.

The ventilation air, drawn off at the primary stages of the HP compressor, which circulates in the annular space G, between the two shafts 217 and 237, is guided through the holes 309P toward the downstream of the LP turbine, in particular toward the bearing oil chamber covers.

Figure 5:
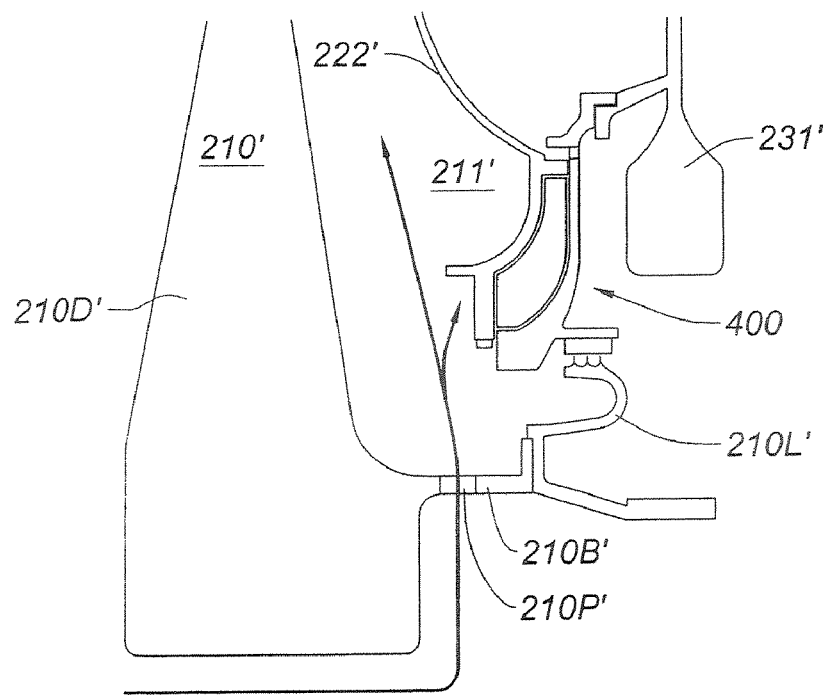
FIG. 5 illustrates a second embodiment.

According to another embodiment, illustrated in FIG. 5, there is the HP turbine disk 210' with a downstream flange 210B', for mounting a labyrinth sealing member 210L'. The wheel 400 is here connected to the LP turbine disk 231' by which it is driven. The wheel 400 as in the preceding solution cooperates with the stator member 222' to form compression channels for the air which is guided through the central passage of the disk 210D', the holes 210P' made in the flange 210B' and coming from the upstream compressor. The air flow is split into a part which purges the downstream cavity 211' of the turbine disk 210' and a part which is drawn into the compression channels of the wheel 400. The wheel 400 comprises openings for ventilating the turbine disks 231' and 233'.

The invention claimed is:

1. A device for ventilating turbine components in a gas turbine engine comprising:
   first and second turbine rotors that are mechanically independent of each other, the first turbine rotor including an HP turbine disk and the second turbine rotor including an LP turbine disk;
   a first ventilation circuit for the LP turbine; and
   an air compression wheel arranged downstream of the HP turbine disk,
   wherein the compression wheel assists in circulation of air in said first circuit.

2. The device, as claimed in claim 1 wherein the compression wheel is arranged between said two turbine disks, HP and LP.

3. The device as claimed in claim 2, wherein the compression wheel is connected to the HP turbine disk.

4. The device as claimed in claim 1, wherein the compression wheel is connected to the LP turbine disk.

5. The device as claimed in claim 1, wherein an air inlet of the compression wheel connects with a passage of the HP turbine disk.

6. The device as claimed in claim 5, wherein the passage is supplied with air coming from an HP compressor.

7. The device as claimed in claim 6, wherein the compression wheel comprises a disk provided with radial vanes which cooperates with a stator baffle to compress the air.

8. The device as claimed in claim 7, wherein the baffle includes air guide vanes.

9. The device as claimed in claim 8, wherein the stator baffle delimits with the HP turbine disk an HP turbine downstream cavity.

10. The device as claimed in claim 9, wherein the air coming from the passage partly supplies the wheel and partly supplies the cavity.

11. The device as claimed in claim 10, wherein the air coming from the passage passes through holes disposed on a flange of the HP disk.

12. The device as claimed in claim 7, wherein the baffle includes an annular deflector which directs air flow exiting the compression wheel toward a base of the LP turbine disk.

13. The device as claimed in claim 1, comprising a second ventilation circuit which ventilates separate bearing oil chamber covers.

14. The device as claimed in claim 13, wherein said second circuit comprises a guide part that is coaxial with a guide part of the first circuit.

15. A gas turbine engine which includes a ventilation device as claimed in claim 1.

16. An air compression wheel for the device as claimed in claim 1, comprising:
a radial plate with a first annular portion provided with mounting holes; and
a second portion provided with radial vanes.

17. The wheel as claimed in claim 16, wherein the first portion is radially inside in relation to the second portion.

18. The wheel as claimed in claim 16, wherein the first portion is radially outside in relation to the second portion.

19. The device as claimed in claim 1, wherein the compression wheel includes a cylindrical portion which supports an outer race of a bearing which holds an HP shaft and an LP shaft.

* * * * *